United States Patent [19]
Barber

[11] Patent Number: 4,853,901
[45] Date of Patent: Aug. 1, 1989

[54] AUTOMATIC LIQUID LEVEL RECORDING DEVICE
[75] Inventor: Dennis D. Barber, Dallas, Tex.
[73] Assignee: Diagnostic Services, Inc., Dallas, Tex.
[21] Appl. No.: 253,405
[22] Filed: Oct. 3, 1988

Related U.S. Application Data
[63] Continuation of Ser. No. 829,945, Feb. 18, 1986, abandoned.

[51] Int. Cl.⁴ ............................................. G01S 1/00
[52] U.S. Cl. .................................... 367/27; 367/908; 364/562; 73/290 V
[58] Field of Search ................ 367/25, 27, 33, 86, 367/908; 181/124; 33/302, 303, 306; 73/290 R, 290 V, 155; 364/562

[56] References Cited
U.S. PATENT DOCUMENTS

| | | | |
|---|---|---|---|
| 2,232,476 | 2/1941 | Ritzmann | 367/86 |
| 2,560,911 | 7/1951 | Wolf | 73/290 V X |
| 3,100,023 | 8/1963 | Clements | 367/908 X |
| 4,210,969 | 7/1980 | Massa | 73/290 V X |
| 4,228,530 | 10/1980 | Bergey | 367/908 X |
| 4,318,298 | 3/1982 | Godbey et al. | 73/290 V X |
| 4,318,674 | 3/1982 | Godbey et al. | 417/36 |
| 4,408,676 | 10/1983 | McCoy | 181/124 X |
| 4,661,932 | 4/1987 | Howard et al. | 367/25 |

Primary Examiner—Thomas H. Tarcza
Assistant Examiner—Tod Swann
Attorney, Agent, or Firm—Ronnie D. Wilson

[57] ABSTRACT

Apparatus and method for obtaining from a well drilled into the subsurface of the earth the information necessary to determine the location of the liquid surface in same. A source of pressure pulses is coupled to the well surface casing in order that the pulses are transmitted downhole where they are reflected by all surfaces present therein such as, the liquid surface, tubing collars and tubing anchors. A transient pressure transducer is provided which generates an electrical output in response to all reflections of the transmitted pulse. All of the reflections occurring in the well are recorded for a sufficient amount of time to ensure the recording of the first reflection from the liquid surface present in the well.

By processing all of the recorded reflections utilizing known values such as the spacing of the tubing collars in the well, a microprocessor in combination with ROM and RAM discriminates between the liquid surface reflection and other reflections in the well, determines the average pressure pulse velocity in the well and the travel time in the well of the liquid surface reflection. All such information is stored in memory for further processing to accurately provide the location of the liquid surface in the well.

29 Claims, 2 Drawing Sheets

AUTOMATIC LIQUID LEVEL RECORDING DEVICE

This application is a continuation of application Ser. No. 829,945 filed 2/18/86 now abandoned.

BACKGROUND OF THE INVENTION

This invention relates to the problem of accurately determining the location of the liquid surface in a well drilled into the subsurface of the earth. More particularly, this invention relates to method and apparatus for economically obtaining the necessary information from a well which will enable one to accurately and efficiently determine the location of the liquid surface therein. This accurate determination of the liquid surface enhances greatly the ability of one skilled in the art to analyze well problems and provide curative measures therefore to increase a given well's production capability.

While the prior art has provided various devices and methods to determine the location of the liquid surface in a given well all have failed to provide one skilled in the art with an apparatus and technique which substantially eliminates the effects of human error, weather conditions and changing downhole conditions on such determination. Representatives of the previous devices include the Sonolog instrument made by the Keystone Development Corporation of Houston, Tex., the Echometer instrument made by the Echometer Company of Wichita Falls, Tex., and the device described in Mobil Oil Corporation's U.S. Pat. No. 4,318,278. Both the Echometer and the Sonolog instrument suffer from the dependence on a field operator to make frequent and multiple calculations and interpretations which provide the opportunity for gross error. These instruments require an operator to trigger a pressure pulse source, record as a function of time the amplitude of pulse reflections in the wellbore annulus on a constant speed chart recorder. These recorded reflections are analyzed by the operator by counting tubing collars and attempting to choose the location on the chart of the liquid reflection. These devices clearly do not provide for frequent economic, efficient and accurate measurement of the liquid surface over any significant period of time and allow for a great deal of human error.

The device and method described in the aforementioned Mobil patent was an improvement over the Echometer and Sonolog devices but also suffers from many deficiencies which are remedied by the invention of the present application.

First of all, the prior device utilizes a gating means which is responsive to the output of a transient pressure transducer for starting and stopping a counting means. When the gating means detects an initiating pressure pulse, it starts the counting means which begins accumulating clock pulses, one for each foot of depth. The counting means accumulates clock pulses until stopped by the gating means. The gating means stops the counting means when an output from the transient pressure transducer is sufficiently large. The number of pulses accumulated in the counting means represents the depth of the liquid surface. Since the gating means is responsive to the amplitude of the output of the transient pressure transducer, any out-put which is sufficiently large will cause the gating means to stop the counting means. There is no test provided to determine if the output from the transient pressure transducer is the reflection from the liquid surface. As the pressure increases in the well annulus, the acoustic transmission properties improve and all the reflections in the wellbore increase in amplitude. The reflection from a tubing anchor, a large collar or any anomaly may become large enough to prematurely activate the gating means and stop the counting means and cause the accumulated clock pulses to represent a depth other than that of the liquid surface.

A second deficiency in the prior device concerns the use of a manually adjustable pulse counter for producing one pulse output for an adjustable number of clock pulse inputs. This manual adjustment is employed to account for the pulse velocity in the well annulus. The value established by the field operator is one of trial and error interpretation. At the beginning of the test, the rate of the pulse counter is established by the field operator, such that the time between succeeding pulses is equal to the time required for sound to travel one foot in the annulus and return to the source. Even if the operator does the calibration perfectly, the device will often give erroneous depth information shortly after the well is shut-in due to a change in the pulse velocity in the well annulus caused by i.e., change in pressure, change in gas constituency or a temperature gradient through the annulus.

A third deficiency in the prior device concerns the use of a calibrated mute time for gating out the initiating pressure pulse and reflections, thereby rendering the gating means inoperative for a known, adjustable period of time beginning with the initiating pressure pulse. If the liquid level in the well annulus rises to a point that the liquid surface reflection time becomes less than the mute time, the device may be disabled for protracted periods of time.

A fourth deficiency in the prior device concerns the use of an adjustable trigger level to activate the gating means for stopping the counting means. Once the gating means has started the counting means, the counting means will accumulate clock pulses until stopped by the gating means. Since the gating means is responsive to any output from the transient pressure transducer which is greater in amplitude than the adjusted trigger level, when an output from the transient pressure transducer is greater in amplitude than the trigger level the gating means will respond by stopping the counting means. In the event a field operator erroneously sets the trigger level, the gating means will fail to respond to the output of the transient pressure transducer and result in loss of data.

A fifth deficiency in the prior device concerns the use of digital readout therein which remains at the well site. The use of digital readout and its attendant support circuitry and the installation thereof in the device merely adds unnecessarily to the overall cost of same and its use, i.e., power cost and the reduction of the time on the well between battery charges. Further, large heavy-duty batteries are required to operate the device for a sufficient period of time to complete a well test. Safety problems present a concern when loading, unloading, connecting and/or charging such batteries as are required to power the device.

A sixth deficiency in the prior device concerns the utilization of a single pressure transducer therein. The appropriate pressure transducer is determined by the field operator based on (1) maximum surface pressure he expects the well to reach during the test, and (2) what pressure transducers he has available to him at the time. Thus, he must estimate such maximum surface pressure. The transducer may be damaged if the surface pressure during the test exceeds the maximum pressure rating of the transducer the operator chooses to install. If, from his available stock, the field operator chooses an inappropriate transducer the pressure reading will clearly be less than accurate. Since the surface pressure during a test can range from low to high, in order to provide the necessary resolution, different transducers should be utilized as the pressure changes. This is practically impossible with only one transducer in the device A seventh deficiency in the prior device concerns the recording of pressure as a digital count which is displayed and/or printed as a digital count. This digital count must be converted to pressure by computation on the part of the field operator creating a situation for human error.

An eighth deficiency in the prior device concerns the necessity of an experienced, skilled field operator to correctly operate the device. The field operator is required to use judgment and experience to set up the device correctly and operate switches in the correct sequence or a large amount of data is lost.

A ninth deficiency in the prior device concerns the fact that the measurement of depth is affected by the energy in the initiating pressure pulse. The reflection of the pressure pulse from the liquid surface does not arrive at the transient pressure transducer as an instantaneous pulse. Dispersion of the pressure pulse in the well annulus and low pass filtering of the transient pressure transducer output result in a signal which arises from 0 to its maximum value in fifty to one hundred milliseconds. The use of a set trigger level in conjunction with the relatively slow rise time can result in reflection arrival time variations of almost 100 milliseconds which represents between 30 to 70 feet. The operator normally attempts to set the adjustable trigger level and acoustic amplifier/gain such that the reflected pressure pulse from the liquid surface is twice the voltage of the trigger level. When a well is shut-in the acoustic characteristics therein change, i.e., normally the gas becomes more conductive to acoustical energy. Thus, the acoustic energy reflected by the liquid surface and received by the transient pressure transducer becomes greater and as the transient pressure transducer output increases in amplitude, the time required for the signal to reach the trigger level decreases making the liquid surface appear shallower than it actually is. Conversely, in the event the solenoid-operated valve which creates the pressure pulse is slow or sluggish (due to temperature or battery age) the resulting pulse can have relatively low energy. In the event the reflected pressure pulse from the liquid surface is just large enough to trigger the gating means, the arrival time will be about 50 milliseconds later than it would be if the reflected energy were twice as large resulting in the liquid surface appearing deeper than it actually is.

A tenth deficiency of the prior device concerns the necessity of having a field operator at the site at all times to adjust the device for changing conditions in the well during a test. For example, in the absence of the field operator, if the (1) surface pressure increases sufficiently some pressure data will be lost and the pressure transducer can be damaged, (2) if the surface pressure decreases sufficiently the pressure resolution will become very poor, and (3) if acoustic properties change sufficiently all data from that point forward will be lost.

SUMMARY OF THE INVENTION

The above-set forth and other deficiencies of the prior art devices are remedied by the invention of the present application. I have found that by recording, for a sufficient amount of time to ensure the recording of liquid surface reflection, all reflections of the pressure pulse, the frequency of which are equal to or less than the maximum expected reflected tubing collar frequency one can subsequently, from said recordings (1) discriminate between liquid surface and other reflections, (2) determine the average pulse velocity in the well annulus, and (3) determine the travel time of the liquid surface reflection in the well, and thereby determine the actual location of the liquid surface in the well.

One object of the present invention is to provide a new and novel method and apparatus for enhancing one's ability to locate the level of the liquid surface in a well drilled through the substrata of the earth.

Another object of the present invention is to provide a new and novel method and apparatus for identifying which pressure pulse reflections are from the liquid surface in a well as opposed to the other reflections therein.

It is a further object of the present invention to provide a new and novel method and apparatus for determing the average pressure pulse velocity in a well.

It is an additional object of the present invention to provide a new and novel method and apparatus for determining the travel time of liquid surface reflections in a well.

It is yet another object of the present invention to provide a new and novel method and apparatus for collecting and retaining information from a well necessary to determine the location of the liquid surface therein whereby the effects thereon of human error, environmental conditions, and power requirements are reduced to a minimum.

Still another object of the present invention is to provide a new and novel apparatus for collecting well data which can retain such and subsequently transmit same to larger and more sophisticated processing equipment for analysis.

It is yet another object of the present invention to provide a new and novel apparatus for collecting and retaining well data from multiple wells which can segregate and identify such multiple well data and transmit same to larger and more sophisticated processing equipment for analysis of all data or each individual well's data.

These and other objects of the present invention will become apparent to those skilled in the art upon the reading of the following description of the preferred embodiments hereof.

Figure 1:
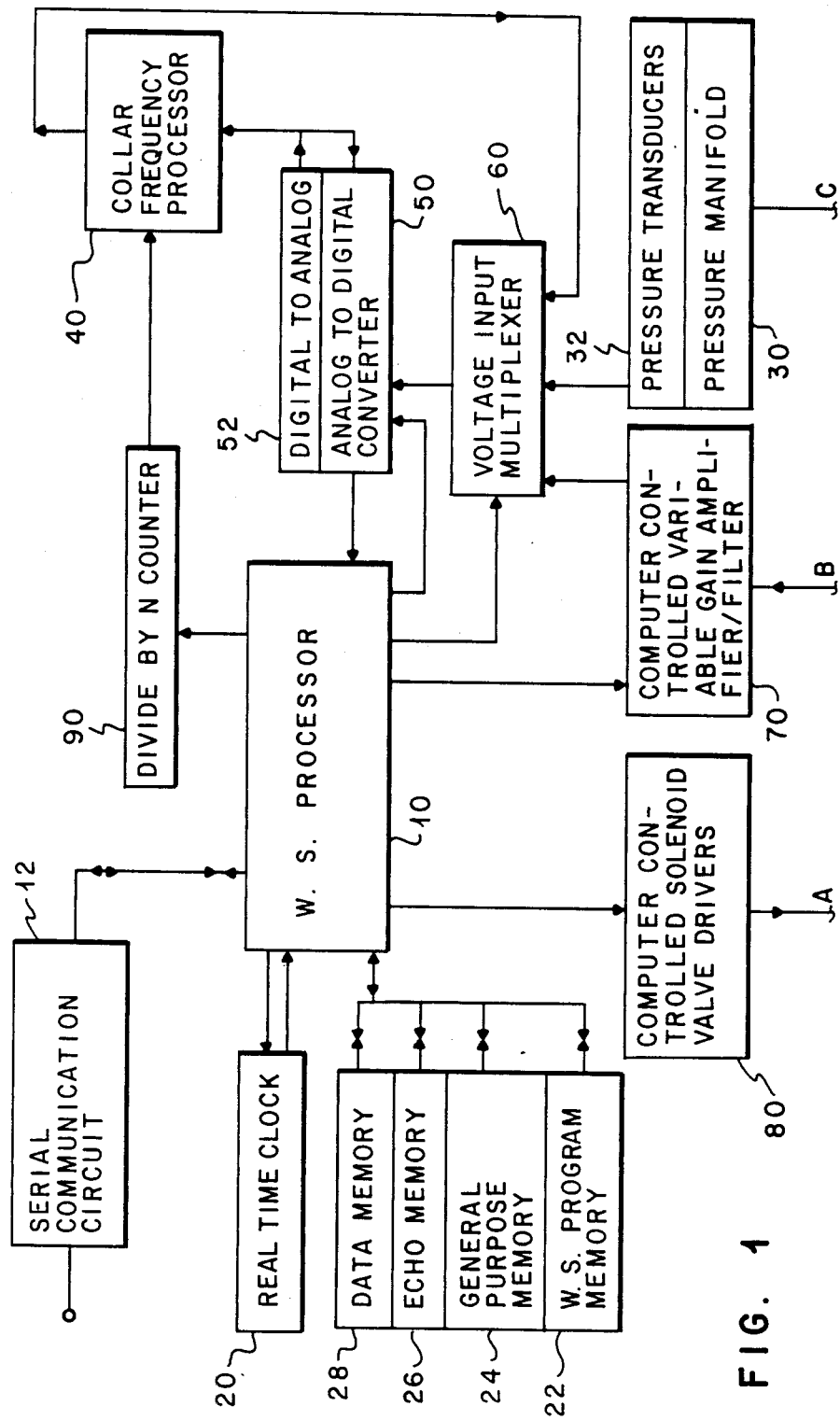
FIG. 1 is a block diagram of the apparatus of the present invention.

In order for one to utilize the present invention as depicted in FIG. 1, there is obviously required a source of pressure pulses for the generation thereof in a well. This invention may utilize the same or a substantially similar source of these pulses and a wellhead arrangement as depicted and described in FIG. 1 and FIG. 2 of U.S. Pat. No. 4,318,278. The electrical and mechanical connections between the invention in FIG. 1 and a suitable wellhead arrangement is depicted by lines A, B and C. Line A electrically connects the solenoid valve driver-80 with a solenoid-operated valve of the wellhead arrangement. Line B electrically connects amplifier/filter-70 with the transient pressure transducer of the wellhead arrangement. Line C mechanically connects pressure manifold-30 with the wellhead arrangement.

DESCRIPTION OF THE PREFERRED EMBODIMENTS

In order to better understand both the method and the apparatus of the present invention, it is necessary at this time to define what will hereinafter be termed a "Shot" since the taking of a Shot in a given well is the basic mechanism which the present invention utilizes to perform its purposes and functions. Therefore, in the context of the present invention, a Shot consists of the following (1) Reading the real time of day, converting same to minutes and storing same in memory;

(2) Reading surface pressure, determining the range of pressure and storing same in memory;

(3) Utilizing the gun arrangement, creating a pressure pulse in the well;

(4) Digitizing and storing all reflections in the well created by the pressure pulse;

(5) Determining and storing in memory a number which represents the frequency of collar reflections at about 2.0-second intervals for about 16.0 seconds; and (6) Determining and storing in memory a number which represents the time required for the pressure pulse to travel down the well, reflect off the liquid surface and return to the surface.

The present invention takes Shots either manually or automatically and goes through the same series of steps in either mode to collect and retain information.

Referring now to FIG. 1 and the previously defined steps in a Shot, the present invention operates as follows:

Step 1: Microprocessor-10 as directed by program memory-22 reads the time of day from real time clock-20 and converts same to minutes and stores this time in data memory-28.

Step 2: Microprocessor-10 as directed by memory-22 selects via voltage input multiplexer-60 an appropriate pressure transducer-32 from pressure manifold-30 in order that the voltage from the selected transducer-32 is applied to analog to digital converter-50; next, microprocessor-10 as directed by memory-22 causes converter-50 to create a number representing said applied voltage; next, microprocessor-10 as directed by memory-22 appends a number representing the pressure range of the selected transducer-32 to said created voltage number and stores same in memory-28.

Step 3: Microprocessor-10 as directed by memory-22 causes solenoid valve driver-80 to actuate the solenoid valve of the gun arrangement permitting entry of the pressure pulse into the well.

Step 4: Microprocessor-10 as directed by memory-22 selects via multiplexer-60, the voltage output of variable gain amplifier/filter-70 for application to converter-50.

Next, microprocessor-10 as directed by memory-22 configures clock-20 to create an interrupting pulse 1,024 times a second.

Next, microprocessor-10 as directed by memory-22 accepts external interrupts from clock-20.

Next, microprocessor-10 as directed by memory-22 waits for an interrupting pulse from clock-20 and upon the receipt of such an interrupting pulse microprocessor-10 as directed by memory-22 creates a number which represents the instantaneous voltage applied to the input of converter-50 from amplifier/filter-70 via multiplexer-60.

Next, microprocessor-10 as directed by memory-22 stores said instantaneous voltage number in echo memory-26. Subsequently-received interrupting pulses are digitized in the same manner and stored contiguously for a period of time which is sufficient to record the reflection from the liquid surface in the well.

Step 5: Microprocessor-10 as directed by memory-22 selects via multiplexer-60 the output of collar frequency processor-40 and directs same to converter-50.

Next, microprocessor-10 as directed by memory-22 configures divide by N counter-90 to supply processor-40 with a frequency that processor-40 will process.

Next, microprocessor-10 as directed by memory-22 retrieves from memory-26 the instantaneous voltage numbers stored in Step 4 and provides said retrieved numbers to converter-50 sequentially beginning with the first of said numbers stored for 2,048 numbers, thereby reproducing at the input of processor-40 the instantaneous voltages applied to the input of converter-50 in Step 4. Processor-40 accumulates charge proportional to the energy at the input of processor-40 only at the frequency supplied by counter-90.

Next, microprocessor-10 as directed by memory-22 converts the voltage at the input of converter-50 from processor-40 via multiplexer-60 to a number representing the voltage and stores same in general purpose memory-24.

For a total of 256 times, Step 5 is repeated wherein each subsequent time counter-90 supplies processor-40 with a frequency that is higher than the previously supplied frequency, thereby storing a total of 256 numbers in memory-24.

Next, microprocessor-10 as directed by memory-22 searches memory-24 for the location of the largest number out of the stored 256 and stores the location of said largest number in memory-28.

All of the foregoing in Step 5 is conducted seven more times, each of said seven times utilizing the subsequent 2,048 numbers stored in memory-26 in Step 4.

Step 6: Microprocessor-10 as directed by memory-22 retrieves each of the largest numbers stored in memory-28 in Step 5 (those numbers represent the collar frequency of the instantaneous voltage echos stored as numbers in memory-26 in Step (4) and computes an average value of the largest numbers (this average value represents an average pressure pulse velocity throughout the wellbore).

Next, microprocessor-10 as directed by memory-22 utilizing said average pressure pulse velocity number computes the average collar frequency in the wellbore. The reciprocal of this computed frequency is the time between the collar reflections recorded in memory-26. Utilizing this time value, microprocessor-10 as directed by memory-22 computes the number of echo locations stored in memory-26 representing that time value by multiplying that time value by 1,024.

Next, microprocessor-10 as directed by memory-22 averages the previously computed number of echo locations in memory-26 and stores this average value in memory-24. This process is repeated sequentially until all the average values obtainable are stored in memory- 24. These average values stored in memory-24 represent the energy content of all reflections from the wellbore caused by the pressure pulse at frequencies below the collar reflection frequency.

Next, microprocessor-10 as directed by memory-22 determines the location of the largest of the average values stored in memory-24 and multiplies said location by the number of locations averaged to obtain the general location in memory-26 of the liquid level reflection.

Next, microprocessor-10 as directed by memory-22 retrieves from said general location in memory-26 the location of the largest number with the correct polarity. Utilizing this retrieved location as the starting point, microprocessor-10 computes the location in memory-26 where the liquid level reflection begins. One way of performing this computation comprises starting at said retrieved location and reading values of decreasing depth until the first location containing a value of zero or opposite polarity to that of said retrieved location is determined.

Next, microprocessor-10 as directed by memory-22 stores in memory-28 the location in memory-26 where the liquid level reflection begins. This stored value represents the travel time from the earth's surface to the liquid surface in the well. By dividing this stored value by 2,048 the travel time down to the liquid surface is converted to seconds.

Figure 2:
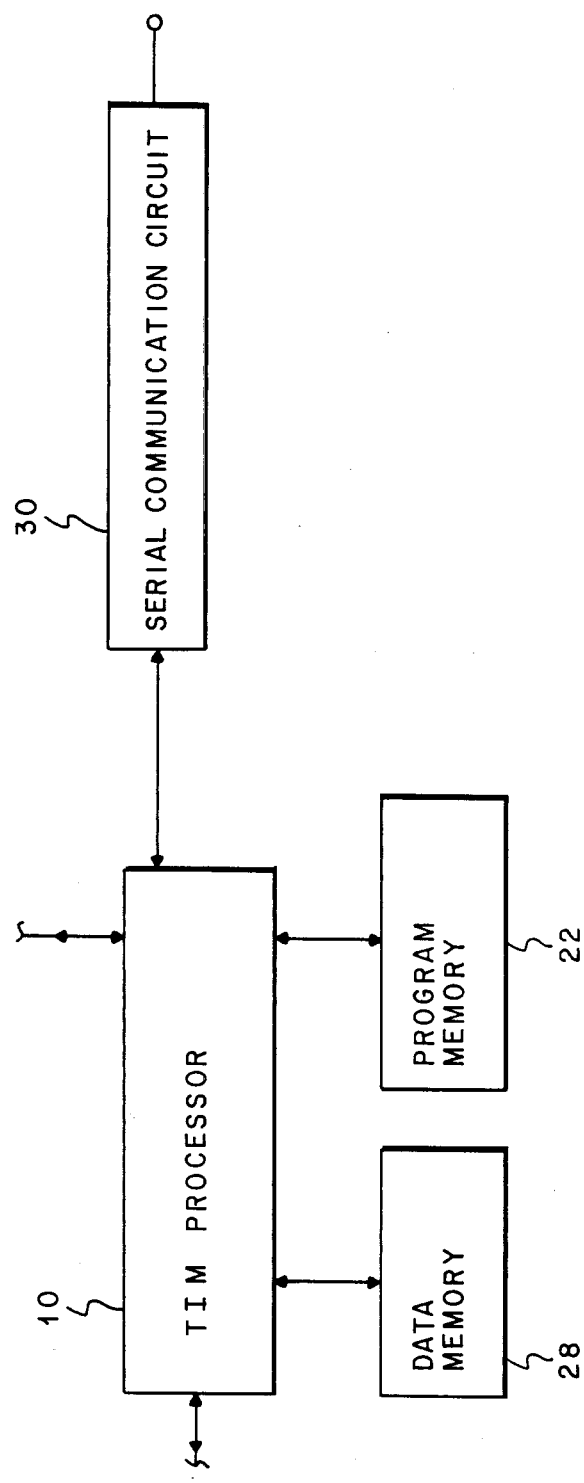
FIG. 2 is a block diagram of an additional aspect of the apparatus of the present invention.

If one desires to retrieve well information stored in the apparatus depicted in FIG. 1 without physically removing the apparatus from a well site, then one suitable way is to utilize the apparatus of FIG. 2 to retrieve same for further analysis. Referring now to FIG. 1 (Well Sounder unit hereinafter "WS") and FIG. 2 (Technician Interface Module unit hereinafter "TIM"), in order to transmit stored information from WS to TIM obviously microprocessors-10 in both TIM and WS must have established protocol. Physically TIM and WS are connected via WS serial port-12 and TIM serial port-30. Preferably, both these ports have low power requirements. The basic interaction between the two units comprises the following steps:

Step 1: Communication is established between TIM microprocessor-10 and WS microprocessor-10 via WS serial port-12 and TIM serial port-30, as directed by TIM program memory-22 and WS program memory-22.

Step 2: WS microprocessor-10 as directed by WS memory-22 asks TIM microprocessor-10 as directed by TIM memory-22, what data TIM wants to retrieve. TIM can obtain from WS all data present in WS data memory-28 or specific data therein as identified by the time of day taken by WS. Whatever data is requested it is transmitted from WS memory-28 to TIM memory-28.

Step 3: TIM microprocessor-10 as directed by TIM memory-22 can transmit any or all data in TIM memory-28 via TIM port-30 to other processing facilities.

It should be noted that the TIM unit is capable of being directed by a computer terminal to print or plot the data in TIM memory-28 to allow an operator to obtain physical evidence of said data.

Referring again to FIG. 1, suitable hardware for an embodiment of the present invention is as follows:

(1) WS Processor-10: consists of a microprocessor IC (integrated circuit) and associated memory ICs and IO (Input/Output) interface ICs. The interface circuits consist of multiplexers, buffers, latches, and decoding logic to allow the microprocessor outputs to select a required memory or IO device and receive from the device or send to the device, pertinent values. In particular the multiplexers are (integrated circuit) 1-of-8 Data Selector/Multiplexers. Any of the 8 outputs of the multiplexer used to select a memory will select one and only one memory IC, either RAM or ROM, except the memory in the highest memory address space will be de-selected if the address to be accessed is within 256 of the highest possible memory address. (The last 256 addresses are reserved for the Real Time Clock-20). Any of the outputs of the multiplexer used to select an input device selects only one input device. Any of the outputs of the multiplexer used to select an output device selects only one output device. Buffers and latches are used to isolate the microprocessor's data and IO busses from the memory and IO devices.

(2) WS Program Memory-22: consists of industry standard Read Only Memory (ROM) or Erasable Programmable Read Only Memory (EPROM). This memory contains the program which is executed by the WS Processor-10 during operation. It also contains all universal and machine dependent constants. This memory employs 64K EPROMs organized as 8192 words by 8 bits. Preferably, the generic type 27C64 CMOS EPROMS are utilized for this memory.

(3) WS General Purpose Memory-24: consists of industry standard Random Access Memory (RAM). This memory is used to hold numerical variables, temporary constants (those pertaining to only one well) and as common memory for passing values between routines in Memory-22. This memory employs 64K RAMs organized as 8192 words by 8 bits. Preferably, the generic type 6264LP CMOS RAMs are utilized for this memory.

(4) WS Echo Memory-26: consists of industry-standard Random Access Memory (RAM). This memory is used to store values which represent the instantaneous voltages which are generated by echos from the well as a result of an initial pressure pulse. This memory employs 64K RAMs organized as 8192 words by 8 bits. Preferably, the generic type 6264LP CMOS RAMs are utilized for this memory.

(6) WS Real Time Clock-20: consists of an IC clock and associated components required to create a clock circuit with independent time-base and power supply. The real time clock keeps time in years, date, day of the week, hours, minutes and seconds. It contains a provision for setting the time of day when it will interrupt the WS Processor-10. It also has a provision for interrupting the WS Processor-10 at regular intervals of as little as 122.07 micro-seconds. This clock is interfaced to the WS Processor-10 such that it appears to occupy the last 256 addresses of the WS Processor-10 address space. Preferably, this clock is generic type 6818 Real IC.

(7) WS Serial Port-12: consists of a serial communication IC (UART, USART or ACIA), baud rate generator circuit, and RS-232-C compatible input/output circuits. The serial communication IC is an IO device which converts an output from the microprocessor to a serial communication output and a serial communication input to microprocessor-compatible input. The baud rate generator is a frequency divider with a selectable division factor. The output is a frequency applied to the clock input of the serial communication IC to allow rates of 75 to 9600 baud. The RS-232-C compatible input and output circuits are voltage level translators. The serial communication IC is of the generic type 6850 Asynchronous Communication Interface Adapter (ACIA). This type IC is less versatile than a Universal Asynchronous Receiver Transmitter (UART) or a Universal Synchronous/Asynchronous Receiver Transmitter (USART) but an ACIA requires less circuit board space, simpler interfacing, less software and less power. Preferably, the serial communication IC is a Hitachi type HD63A50 or HD63B50 ACIA. This is a CMOS device and thus requires less power than the generic equivalent 6850. The baud rate generator is implemented with two divide by 16 counter ICs. One counter has a modified count such that its output frequency is usable as the clock input to the ACIA and second counter. The second counter divides the output of the first by 2, 4, 8 and 16 each of which may also be applied to the ACIA clock input. The RS-232-C compatible output circuit is a two-transistor circuit with an output which is inverted relative to its input and has voltage levels which are positive and negative while the input voltage levels are always positive or 0. The RS-232-C input circuit employs a single inverter/buffer, of a hex inverter/buffer IC, and two resistors, one for current limiting and one as a 0 voltage reference.

(8) Solenoid Valve Drive-80: consists of transistor voltage level translators which drive the inputs of high current transistors or darlington connected transistor pairs. A high current transistor or darlington pair, when activated through its voltage level translator, supplies current, at the battery voltage, to the solenoid of a solenoid valve.

(9) Variable Gain Amplifier/Filter-70: consists of 4 sub circuits; (1) an input preamp; (2) a 25HZ low pass filter; (3) an intermediate amplifier state; and (4) a digitally-controlled gain block. The preamp is of the charge integrating type. It has input surge voltage protection, and a logarithmic gain response. Gain is supplied by an IC operation amplifier and associated descrete components. The 25Hz low pass filter is of the elliptic or inverse-hyperbolic type, implemented using an active-filter design. The design uses operational amplifier ICs, resistors and capacitors. The intermediate amplifier consists of an operational amplifier IC, 2 resistors and an output decoupling capacitor. The digitally controlled gain block consists of a 10-bit digital to analog converter, and IC operational amplifier and the various resistors required to implement this proprietary design

(10) Voltage Input Multiplexer-60: a 1-of-8 analog multiplexer such as an industry standard CD4051. It is one of the output devices controlled by the WS Processor-10. This device allows WS Processor-10 to select any of various voltage sources to be converted from a voltage to a representative digital value.

(11) Pressure Manifold-30: connected, through appropriate plumbing, to the surface of a well for the purpose of distributing the surface pressure to several pressure transducers.

(12) Pressure Transducers-32: devices which convert surface pressure to a voltage proportional to the pressure. Each of the transducers operates over a limited range of pressures. No two transducers have the same operating range. All pressure transducers are connected to the surface casing pressure of a well through a manifold arrangement. Individual pressure transducers are selected by the WS Processor-10, as directed by Memory-22.

(13) Divide-by-N Counter-90: divides a fixed input frequency by a divisor supplied by the WS Processor-10, as directed by Memory-22. The output (frequency) of an extended range divide by N counter is applied to the input of an 8-stage binary counter with each of its 8 outputs available. The extended range Divide-by-N Counter is an output device of the WS Processor-10. W.S. Processor-10 supplies values from 0 to 255 to the extended range divide-by-N Counter which, in response, divides its input frequency by 128 to 383. The extended range divide-by-N Counter is implemented using two 4-bit divided-by-N Counter ICs, and associated gating and switching logic ICs as required.

(14) Collar Frequency Processor-40: a set of digitally controlled, primarily analog circuits. The circuits are: (a) a digitally controlled band pass filter; preferably the digitally controlled band pass filter is an N-path filter, with $N=16$. This filter employs 1 of 8 analog multiplexer ICs, and descrete components, resistors and capacitors; (b) a circuit which collects energy which passes through the filter; a polarity independent charge integrating circuit, employing IC operational amplifiers, collects the charge on the N-path filter capacitors and converts the charge to a voltage proportional to the charge; (c) digitally controlled analog switching circuits for applying a voltage, which represents the energy passed by the filter to the Multiplexer-60. This voltage is then digitized by the WS Processor-10 through the Analog-to-Digital Converter; the analog switching circuits, made of 1-of-4 analog multiplexers, under the control of the WS Processor-10, selectively; discharge the filter capacitors, discharge the charge-integrating capacitor, connects the charge-integrating capacitor to an operational amplifier for charge to voltage conversion. This voltage is applied to Multiplexer-60 so it may be converted to a representative digital value and stored by the WS Processor-10 in Memory-24. Inputs to this Processor are: (a) an analog representation of well echos supplied by the WS Processor-10, from Memory-26, through Converter-50; (b) comparison frequencies supplied by the WS Processor-10 through Counter-90; and (c) digital inputs from the WS Processor-10 to control the analog switching circuits.

(15) Digital to Analog/Analog to Digital Converter-50: consists of a 10-bit digital to analog converter (DAC) IC, a buffer/amplifier employing an operational amplifier IC and a voltage comparator/level translator employing an operational amplifier IC. The digital inputs to the DAC are supplied by WS Processor-10. The output of the DAC is applied to the input of the buffer-/amplifier. Inputs to the comparator/level translator are from the output of the buffer/amplifier and a voltage (to be converted) source through Multiplexer-60.

Analog to Digital conversion is accomplished by successive approximation as follows:

The WS Processor-10, as directed by Memory-22, supplies a 10-bit digital value to the 10-bit DAC. The resulting voltage output of the DACs buffer/amplifier is applied to one input of the comparator/level translator for comparison with the voltage being applied through Multiplexer-60 to the other input of the comparator/level translator. The WS Processor-10, as directed by Memory-22, tests the output of the comparator/level translator each time it supplies a new value to the DAC. A decision is made, based on the binary value out of the comparator/level translator, whether to use or disregard the last value supplied to the DAC. Used values are added together to yield a number which represents the voltage applied.

The above hardware and requisite software form an Analog to Digital Converter. Preferably, the 10-bit DAC is an Analog Device type AD7533LN. Preferably, the operational amplifiers are Analog Device type AD542LH.

Referring again to FIG. 2, suitable hardware for an embodiment of the present invention is as follows:

(1) TIM Processor-10 consists of a microprocessor IC (integrated circuit) and associated memory ICs and IO (Input/Output) interface ICs. The interface circuits consist of multiplexers, buffers, latches, and decoding logic to allow the microprocessor outputs to select a required memory or IO device and receive from the device or send to the device pertinent values. In particular the multiplexers are (Integrated Circuit) 1-of-8 Data Selector/Multiplexers. Any of the 8 outputs of the multiplexer used to select a memory will select one and only one memory IC, either RAM or ROM. Any of the outputs of the multiplexer used to select an input device selects only one input device. Any of the outputs of the multiplexer used to select an output device selects only one output device. Buffers and latches are used to isolate the microprocessor's data and IO busses from the memory and IO devices.

(2) TIM Program Memory-22: consists of industry-standard Read Only Memory (ROM) or Erasable Programmable Read Only Memory (EPROM). This memory contains the program which is executed by the TIM Processor-10 during operation. It also contains all universal and machine-dependent constants. This memory employs 64K EPROMs organized as 8192 words by 8 bits. Preferably the generic type 27C64 CMOS EPROMS are utilized for this memory.

(3) TIM Data Memory-28: consists of industry-standard Random Access Memory (RAM). This memory is used to store data which are generated for each time-dependent measurement; i.e., time, transit time to the liquid, surface pressure value, pressure pulse velocity values, etc. This memory is used also to hold parameters of each well for which data is being stored. This memory is used also to hold temporary numerical and character values. This memory employs 64K RAMs organized as 8192 words by 8 bits. Preferably, the generic type 6264LP CMOS RAMs are utilized for this memory.

(4) TIM Serial Port-30: Consists of a serial communication ICs (UART, USART or ACIA), a baud rate generator circuit and RS-232-C compatible input/output circuits. The serial communication IC is an IO device which converts an output from the TIM Processor-10 to a serial communication output and a serial communication input to a TIM Processor-10 compatible input. The baud rate generator is a frequency divider with a selectable division factor. The output is a frequency applied to the clock input of the serial communication IC to allow rates of 75 to 9600 baud. The RS-232-C compatible input and output circuits are voltage level translators. The serial communication ICs are of the generic type 6850 Asynchronous Communication Interface Adapter (ACIA). This type IC is less versatile than a Universal Asynchronous Receiver Transmitter (UART) or a Universal Synchronous/Asynchronous Receiver Transmitter (USART) but an ACIA requires less circuit board space, simpler interfacing, less software and less power. Preferably, the serial communication IC is Hitachi type HD63A50 or HD63B50 ACIA. This is a CMOS device and thus requires less power than the generic equivalent 6850. The baud rate generator is implemented with two divide by 16 counter ICs. One counter has a modified count such that its output frequency is usable as the clock input to the ACIA and second counter. The second counter divides the output of the first by 2, 4, 8 and 16 each of which may also be applied to the ACIA clock input. The RS-232-C compatible output circuit/s is a two-transistor circuit with an output which is inverted relative to its input and has voltage levels which are positive and negative while the input voltage levels are always positive and negative while the input voltage levels are always positive or 0.The RS-232-C input circuit employs a single inverter/buffer, of a hex inverter/buffer IC, and two resistors, one for current limiting and one as a 0 voltage reference.

In another embodiment of the present invention, after a field technician establishes communication with the WS unit via a portable computer terminal via the TIM unit and informs the WS unit a new test is beginning, the WS unit will operate automatically. In such an automatic operation the WS unit will repetitively (1) determine well surface pressure and store it in memory, (2) determine the elapsed time since the test began and store it in memory, (3) initiate a pressure pulse in the well annulus, (4) record all reflections from the well for a period of up to 32 seconds, (5) determine the pressure pulse velocity in the well at approximately 1000-foot intervals and store these pulse velocities in memory, (6) determine the transit time to the liquid surface and store the transit time in memory, (7) determine the transit time to a known feature and store it in memory (which aids in accurate depth determination), and (8) set an alarm in its internal clock so that the well sounding unit can be informed when it is time to repeat the sequence of steps.

As a result of the utilization of this invention, the previously set forth deficiencies of prior art devices are substantially eliminated. Specifically, the present invention eliminates the need for a gating means, the use of a manually-adjusted pulse counter, and the effect on the depth measurement by the energy in initiating pulse. This is accomplished by having a recording means responsive to the output of transient pressure transducer, by recording all reflections from the well annulus for a sufficient period of time to allow the liquid surface reflection to be recorded and by analyzing the recorded reflections with a computer and computer program and/or analog/digital hardware; it is possible to discriminate between the liquid surface reflection and other well anomalies as well as to determine the pulse velocity for each initiated pressure pulse and determine at what point in time the reflected signal began to move from its zero or baseline value toward the peak which has been identified as the liquid surface reflection signal.

Further, the present invention eliminates the use of calibrated mute time for gating out the initiating pressure pulse and reflection by employing an amplifier responsive to the output of transient pressure transducer having its gain controlled by a computer. The computer can set the gain to a predetermined low level prior to initiating the pressure pulse so that the initial impact of the pulse is no greater than the smaller reflected pulses.

In addition, the present invention eliminates the use of an adjustable trigger level to activate gating means for stopping counting, by employing an amplifier responsive to the output of a transient pressure transducer having its gain controlled by a computer so that the effect of large repetitive reflections, such as those from shallow collars, are compensated for.

Further, the present invention provides a readout unit which is capable of displaying numbers, letters and symbols in a separate unit which can support several WS units, thereby greatly reducing the cost per unit.

An additional feature of the present invention concerns the use of several pressure transducers which are selectable by the built-in computer, thereby enabling the appropriate pressure transducer for the existing surface pressure to be utilized.

Further, the present invention is capable of recording the pressure as a fraction of full scale pressure plus a pressure conversion factor, thereby converting the recorded value into pounds per square inch before being displayed or printed.

A further feature of the present invention concerns the elimination of the need for a skilled, experienced field operator. The present invention has no set-up/calibration procedure, it requests information from the operator, has automatic gain control, automatic velocity measuring capability, it is not sensitive to trigger amplitude and does not require a fixed sequence of events that need to be remembered by the operator, thus allowing him to concentrate on efficiency rather than memory about what to do next.

Power requirements in one embodiment of the present invention are significantly less than in known devices of this type. In order to function in its stand-by mode the microprocessor utilized requires no more than 4 milliamps, in its operating mode it requires no more than 15 milliamps. The Read Only Memory utilized herein requires no more than 8 milliamps to function. The Random Access Memory utilized herein in its operating mode requires no more than 40 milliamps and in its stand-by mode, no more than 0.002 milliamps. These relatively low power requirements enable one to utilize a small non-hazardous battery making charging very simple. By greatly reducing power requirements, both the WS and TIM units of the present invention can be packaged in briefcase-size containers for ease in transportation to well sites.

While this invention has been set forth by a variety of embodiments, it is not so limited and many variations thereof will be apparent to one skilled in the art without departing from the true spirit and scope of this invention. It should be understood that this invention is not necessarily limited to the above-set forth discussion.

Therefore, I claim:

1. Apparatus for collecting and retaining information from a well drilled through the substrata of the earth in order to determine the location of the liquid surface in said well which comprises:
    a. a source of pressure pulses coupled to said well;
    b. a transient pressure transducer coupled to said well which generates an electrical output in response to the downhole reflection of pressure pulses produced by said source;
    c. means responsive to the output of said transducer for recording all of said reflections; which comprises a microprocessor in communication with ROM and RAM which by comparing the relative energy levels integrating the values of said recorded reflections in said RAM determines the set of recorded reflecting values with the largest relative, energy level which represents the liquid surface reflection;
    d. means operably connected to said recording means for discriminating between liquid surface reflection and other reflections in said well;
    e. further means operably connected to said discriminating means for determining the average pressure pulse velocity in said well;
    f. an additional means operably connected to said discriminating means for determining the travel time in said well of said liquid surface reflections; and
    g. an additional means operably connected to said discriminating and determining means for retaining all of said information obtained by said means.

2. Apparatus as in claim 1 which includes additional means operably connected to said retainage means which comprises:
    a. means for collecting the information from said retainage means;
    b. means for retaining said collected information; and
    c. means for transmitting said collected information to further means for the analysis of same.

3. Apparatus as in claim 2 which includes means for generating print-outs of said collected information.

4. Apparatus as in claim 1 wherein said recording means comprises:
    a. an amplifier;
    b. a filter operably connected to said amplifier;
    c. an analog to digital convertor responsive to the output of said filter; and
    d. a microprocessor which reads the output of said convertor and stores same in RAM.

5. Apparatus as in claim 4 which includes an analog switch responsive to the output of said filter.

6. Apparatus as in claim 1 wherein said microprocessor functions in its stand-by mode with no more than 4 milliamps.

7. Apparatus as in claim 1 wherein said microprocessor functions in its operating mode with no more than 15 milliamps.

8. Apparatus as in claim 1 wherein said ROM functions with no more than 8 milliamps.

9. Apparatus as in claim 1 wherein said RAM functions in its operating mode with no more than 40 milliamps.

10. Apparatus as in claim 1 wherein said RAM functions in its stand-by mode with no more than 0.002 milliamps.

11. Apparatus as in claim 1 wherein said velocity determination means comprises:
    a. a microprocessor in communication with ROM and RAM which computes the frequency of the recorded collar reflections utilizing values from said RAM by executing instructions from said ROM.

12. Apparatus as in claim 11 wherein said microprocessor functions in its operating mode with no more than 4 milliamps.

13. Apparatus as in claim 11 wherein said microprocessor functions in its operating mode with, no more than 15 milliamps.

14. Apparatus as in claim 11 wherein said ROM functions with no more than 8 milliamps.

15. Apparatus as in claim 11 wherein said RAM functions in its operating mode with no more than, 40 milliamps.

16. Apparatus as in claim 11 wherein said RAM functions in its stand-by mode with no more than 0.002 milliamps.

17. Apparatus as in claim 1 wherein said travel time determination means comprises:
   a. a microprocessor in communication with ROM and RAM which computes the time between a recorded start of a pressure pulse and the recorded reflection of said liquid surface utilizing values from said RAM by executing instructions from said ROM.

18. Apparatus as in claim 17 wherein said microprocessor functions in its stand-by mode with no more than 4 milliamps.

19. Apparatus as in claim 17 wherein said microprocessor functions in its operating mode with no more than 15 milliamps.

20. Apparatus as in claim 17 wherein said ROM functions with no more than 8 milliamps.

21. Apparatus as in claim 17 wherein said RAM functions in its operating mode with no more than 40 milliamps.

22. Apparatus as in claim 17 wherein said RAM functions in its stand-by mode with no more than 0.002 milliamps.

23. A method for collecting and retaining information from a well drilled through the substrata of the earth in order to determine the location of the liquid surface in said well comprising the steps of:
   a. repetitively generating pressure pulses in said well to produce reflections thereof over a period of time;
   b. recording all of said reflections for a sufficient amount of time to ensure the recording of liquid surface reflection; and
   c. processing said recorded reflection to
      (1) discriminate between the liquid surface reflection and other reflections; by digitizing and comparing the relative energy levels of all reflections to locate the recorded reflection with the largest relative energy level which represents the liquid surface reflection;
      (2) determine the average pressure pulse velocity; and
      (3) determine travel time of said liquid surface reflection.

24. Method of claim 23 wherein said pulses are generated in an annulus between the casing and a tubing string of said well.

25. Method of claim 24 wherein said pulses are generated on very minute or less for a period of no less than 30 minutes from shut-in of said well.

26. Method of claim 23 wherein said sufficient time is the mount necessary to record the first reflection from said liquid surface.

27. Method of claim 23 wherein said average pressure pulse velocity determination comprises computing the frequency of the recorded collar reflections and integrating said frequency with the known average tubing collar spacing in said well.

28. Method of claim 23 wherein said travel time determination comprises computing the time between the start of a recorded pressure pulse and its recorded reflection from said liquid surface.

29. Method of claim 23 wherein said processed recorded reflections have a frequency which is equal to or less than the maximum reflected tubing collar frequency.

* * * * *